United States Patent Office 3,150,114
Patented Sept. 22, 1964

3,150,114
HYDROLYSIS RESISTANT POLYESTER
URETHANES
Joseph Rockoff, Dayton, Ohio, assignor to Dayco Corporation, Dayton, Ohio, a corporation of Ohio
No Drawing. Filed Oct. 20, 1960, Ser. No. 63,731
2 Claims. (Cl. 260—45.95)

This invention relates to urethane compositions and more particularly to urethane elastomers of improved moisture resistance suitable for use in printing rollers, gaskets and the like.

The rubber-like elastomers resulting from the reaction between a polyester and a diisocyanate show properties similar to natural and artificial rubber compositions. The polyesters normally employed are condensation products of di or polybasic organic acids with di- or polyhydric alcohols in a reaction represented by the following:

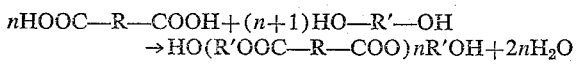

$$\rightarrow HO(R'OOC-R-COO)nR'OH + 2nH_2O$$

If the mole quantity of the acid is less than the mole quantity of the alcohol, there results a polyester having terminal hydroxy groups. Control of the size polyester may be accomplished by varying the ratio of $(n+1)/n$, as is well known in the art. The addition of triols to the above starting mixture results in branching of the chain to yield what might be called a three-dimension polyester. Since these polyester compounds are long chain molecules, it is convenient to identify them in terms of the theoretical hydroxyl number or the number of milligrams of KOH equivalent to 1 gram of the polyester resin.

The polyurethane elastomer is produced by the reaction of a polyester and a di- or polyisocyanate under substantially anhydrous conditions. It is the usual practice as is well known in the art, to employ a toluene diisocyanate mixture of 80% of the 2,4-isomer and 20% of the 2,6-isomer. The resulting polyurethane elastomers show some resistance and possess a fair degree of tensile strength and elasticity. The hardness of these elastomers, which ranges from 10 to 60 Shore "A," makes these elastomers particularly suitable and desirable as printing roller materials and the like. The particular hardness between the range of 10 to 60 may be achieved by selecting the proper ratio of polyester resin to the diisocyanate.

Unfortunately, the above products, especially in the softer ranges below 60, exhibit a tendency to undergo a hydrolysis in the presence of water or ambient atmospheric moisture which causes the elastomers to become soft and sticky, thereby rendering them useless as roller materials and the like. One source of the harmful water which causes hydrolysis of the above mentioned polyurethanes arises in printing inks of the embossing, intaglio, lightfast, non-inflammable and quick drying variety. A previous approach to the elimination of such softening of printing rollers employing urethane elastomers has been the use of polyethers rather than polyesters as set forth, for example, in U.S. Patent No. 2,866,774 issued December 30, 1958.

Thus it is an object of this invention to provide a polyurethane elastomer made by the reaction of a polyester and diisocyanate which is stable in water and ambient atmospheric moisture.

Another object of this invention is the provision of a method of rendering polyester based polyurethane elastomers stable to water by addition to either the polyester or the diisocyanate of a substituted phenol prior to the reaction of these compounds.

A further object is the provision of a novel water and moisture stable polyurethane elastomer for use in printing rollers and the like.

Other objects and advantages of this invention will be apparent from the following description and the appended claims.

In accordance with the present invention, a polyester resin formed by the reaction of a polybasic organic acid and a polyhydric alcohol is pretreated with a substituted phenol, and subsequently the pretreated resin is reacted with a diisocyanate to produce a water stable polyurethane elastomer suitable for use in circumstances such that the elastomer will be exposed to moisture. The polyester resin employed in accordance with this invention may be the reaction product of a polybasic organic acid such as adipic, sebacic, phthalic, isophthalic, terephthalic, oxalic, malonic, succinic, maleic, fumaric, itaconic, etc. with polyglyols of the diol, triol, or higher type, or mixtures thereof having the general formula —HO—R—OH', HR(OH)$_3$ or (HOC)$_2$ R(COH)$_2$. Such alcohols are generally well known in the art, and the following are included merely as illustrative: ethylene glycol; diethylene glycol; pentaglycol; glycerol; sorbitol; propylene glycol; 1,3-butylene glycol; triethylene glycol; tetraethylene glycol; 2,3-butanediol; 1,4-butanediol; pentaerythritol, and the like.

While linear polyesters of the

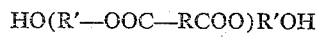

type may be employed, it is preferred to employ three-dimensional polyesters of the type such as are produced by the reaction of a polybasic acid of the HOOCRCOOH type with a mixture of diols and triols of the HO—R'—OH and

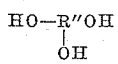

type.

Typical di- and polyisocyanates which may be employed are: m- and p-phenylene diisocyanate; toluene diisocyanate; p,p' diphenyl diisocyanate; and the substituted products such as p,p'-diphenyl-3,3'-dimethyl diisocyanate; for example. While either an aromatic or aliphatic polyisocyanate may be employed, it is preferred to employ aromatic compounds. Of the aromatic compounds, it is preferred to employ the 80/20 mixture of the 2,4- and 2,6-isomer of toluene diisocyanate since such mixture is readily available commercially and provides a product of the desired characteristics.

The substituted phenols which may be employed include among others the following: p-aminophenol; m-aminophenol; 2-amino-4,6-dinitrophenol; 2-amino-3-nitrophenol; 2-amino-4-nitrophenol; ortho or para or meta aminothiophenol, or the ortho, para, meta homologs of the following compounds: amoxyphenol, anilinophenol, bromophenol, chlorophenol, iodophenol, nitrophenol, and the various homologs of dibromo, diiodo, and dinitrophenol as well as the various homologs of the triamino, triiodo, tetraiodo, tetrabromo phenols.

It is however preferred to employ p,p'-isopropylidene diphenol, since this compound appears to have the most active hydroxyl groups per molecular weight. It has been discovered that an elastomer produced by the reaction of a diisocyanate with a polyester in the presence of cross-linking agents such as polyalcohols of the ethylene glycol, glycerol, butynediol, triethylene glycol and the like, as are well known art, produce a hard elastomer which is fairly resistant to hydrolysis due to the fact that the cross-linking has rendered inactive those groups normally susceptible to hydrolysis, yet such cross-linked elastomers are much too hard for printing rollers, gasket material and the like.

In accordance with the present invention, a resilient product having a Shore "A" durometer hardness under 60 is produced by the reaction of a polyester with a diisocyanate in the presence of a substituted phenol, thus giving a relatively soft product having considerable stability in the presence of moisture and ambient humidity, a characteristic heretofore unattainable in polyurethane elastomers produced from polyesters. The products are produced as described above, and a preferred form of resin used in the production has a corrected hydroxyl number of 57 to 63 and an acid number of 0.8 to 1.5 with a water content of less than 0.10%. The preferred diisocyanate is the 80/20 mixture of the 2,4- and the 2,6-toluene diisocyanate, although it is understood that any of the above mentioned di- and polyisocyanates may be employed if desired.

The preferred substituted phenol employed in accordance with the present invention is p,p'-isopropylidene diphenol which exhibits a remarkable hydrolysis retarding effect. Use of ½ to 5% of this substituted phenol has proved satisfactory and tests have indicated that the presence of the substituted phenol in an amount of 1½ to 2½ parts per 100 parts of polyester resin produce exceptional results. It is possible to add the phenol compound to either the polyester resin or the diisocyanate. In the compounding procedure, 0.5 to 5% and preferably 1.5 to 2.5 of the phenol are added to 100 parts of the polyester resin. The diisocyanate is then added in an amount of 6 to 12 parts and the mixture is stirred and poured into suitable molds for curing. Care is taken to avoid introduction of water which may produce carbon dioxide during the reaction, thereby resulting in a porous foam type composition.

If it is desired to produce a product which is harder than 60 Shore, as well as one having a hardness between 10 and 60, the proportion of the di- or polyisocyanate is increased to increase the hardness, as is well known in the art. It is possible in accordance with the principles of this invention to produce a polyurethane elastomer having the desired hardness and being substantially water resistant for use in printing rollers and the like.

As illustrative of the several possible formulations embodying the principles of the present invention, the following examples are offered:

Example I

To 100 parts of polyester resin heated to 115° C. was added 0.5 part of p,p'-isopropylidene diphenol. The mixture was then cooled to 70° C. and 7.75 parts of a 80/20 mixture of 2,4- and 2,6-toluene diisocyanate was added. The mixture was stirred for ten minutes under vacuum and poured into suitable molds and cured for 3½ hours at 290° F. The resulting product was a flexible elastomer which showed exceptional stability during exposure to extreme humidity conditions.

Example II

The procedure of Example I was followed employing 1.0 parts of the substituted phenol.

Example III

The procedure of Example I was followed with the use of 1.5 parts of the substituted phenol.

Example IV

The procedure of Example I was followed with the use of 2.0 parts of the substituted phenol.

The product resulting from each of the above examples was a polyurethane elastomer having a Shore durometer below 60 and showing exceptional resistance to hydrolysis caused by water or ambient moisture. Each of the sheets formed in the above examples was exposed to 100% humidity conditions at a temperature of 158° F. for a period of ten days. In each case the hardness reading dropped only a few points. An elastomer sheet prepared as set forth in Example I without the incorporation of the substituted phenol was tested under the same conditions and completely dissolved within the ten day period. In the absence of water, the elastomer containing the substituted phenol exhibited physical properties similar to the elastomer prepared without the substituted phenol. Tests of the elastomer prepared in accordance with the present invention in various organic solvents such as diisobutylene, benzene, toluene, xylene, glycerol and the like showed that there was little, if any, reduction of hardness or resistance to hydrolysis.

One of the most interesting and expected features of the present invention may be understood with reference to the following analysis. In formulations of polyurethane elastomers from polyesters, the softer products, especially in the range of 10 to 60 hardness have an increasing tendency towards hydrolysis, and as a general rule in the case of such elastomers, the tendency toward hydrolysis increases as the Shore hardness decreases. From a theoretical point of view, this is of course, to be expected, since the polyester is present with increasingly large numbers of unreacted groups as the amount of diisocyanate decreases. In accordance with the present invention, exceptional resistance to hydrolysis over substantially the entire range of hardness is possible by incorporating a substituted phenol into the reaction mixture, thereby enabling the use of elastomers heretofore unavailable in applications wherein the material will be exposed to high moisture conditions.

While the above preferred embodiments have been disclosed in terms of toluene diisocyanate, a polyester formed by reaction of adipic acid with a diol and triol, and the use of preferred form of substituted phenol, it is understood that virtually any of the well known prior art polyesters and di or polyisocyanates may be employed in formulations which are well known in the art. Substituted phenols other than the preferred may be employed. However, to achieve the same desirable ends, it is necessary to use an amount of such phenol in excess of 1½ to 5 parts, since the reactivity thereof decreases due to the presence of functional groups which tend to decrease the activity of the hydroxyl group. For example, p,p'-isopropylidene diphenol is preferred; next in order, polytetrabutylene phenol; then tetrabromo phenol; and lastly, catechol. In the case of the last three phenols, an excess of 1½ to 5 parts of the substituted phenol is required to produce the same product as is achieved with a given amount of the first. A blocking action seems to occur by the use of these substituted phenols, although the exact reasons for this phenomenon are not fully understood. At any rate, the highly unusual and unexpected result occurring is believed to provide a novel compound for the purposes set forth.

It should be noted that all references to parts of the reaction products are by weight.

As many widely different embodiments of this invention may be made without departing from the spirit and scope thereof, it is to be understood that this invention is not limited to the specific embodiments thereof except as defined in the appended claims.

What is claimed is:

1. The process of forming a polyurethane elastomer comprising reacting 100 parts of a polyester resin having at least two groups capable of reacting with an isocyanate, with at least 6 parts of an organic diisocyanate, and with ½ to 5 parts of p,p'-isopropylidene diphenol, to form an elastomeric product which is stable to hydrolysis, all of said parts being by weight.

2. The reaction product of a polyester resin formed by the reaction of a polycarboxylic acid with a polyol selected from the group consisting of aliphatic diols, aliphatic triols, aliphatic tetrols, and mixtures thereof; at least 6 parts per 100 parts by weight of said resin of an organic diisocyanate; and ½ to 5 parts of p,p'-isopropylidene diphenol per 100 parts by weight of said resin.

References Cited in the file of this patent

UNITED STATES PATENTS

| | | |
|---|---|---|
| 2,828,278 | Kosmin | May 25, 1958 |
| 2,984,645 | Hoeschele | May 16, 1961 |

FOREIGN PATENTS

| | | |
|---|---|---|
| 773,991 | Great Britain | May 1, 1957 |
| 810,489 | Great Britain | Mar. 18, 1959 |
| 822,547 | Great Britain | Oct. 28, 1959 |
| 1,042,889 | Germany | Nov. 6, 1958 |